United States Patent [19]

Heinemann

[11] Patent Number: 5,307,846
[45] Date of Patent: May 3, 1994

[54] TIRE PRESSURE EQUALIZER

[76] Inventor: Robert Heinemann, 147 Elm St., Dover, N.J. 07801

[21] Appl. No.: 36,410

[22] Filed: Mar. 24, 1993

[51] Int. Cl.$^5$ .................................... B60C 29/02
[52] U.S. Cl. .......................... 141/1; 141/38; 141/83; 137/223; 152/415; 73/146
[58] Field of Search ............... 141/38, 83, 1; 73/146, 73/146.2, 146.8; 152/415; 137/223, 224, 228, 231

[56] References Cited

U.S. PATENT DOCUMENTS

| | | |
|---|---|---|
| 3,208,425 | 9/1965 | Jousma et al. |
| 3,335,766 | 8/1967 | Winger .................................. 141/38 |
| 3,479,868 | 11/1969 | Boyer . |
| 3,926,205 | 12/1975 | Gourlet ................................ 137/223 |
| 4,427,022 | 1/1984 | Forney ............................. 224/231 X |
| 4,658,869 | 4/1987 | Soon-Fu ................................ 141/98 |
| 4,763,709 | 8/1988 | Scholer ............................. 141/38 X |
| 5,158,122 | 10/1992 | Moffett ................................ 141/38 |

FOREIGN PATENT DOCUMENTS

| | | | |
|---|---|---|---|
| 2720387 | 11/1978 | Fed. Rep. of Germany ...... | 137/231 |
| 1302014 | 7/1962 | France .................................. | 141/38 |
| 340422 | 9/1959 | Switzerland ....................... | 141/38 |
| 399930 | 9/1965 | Switzerland ....................... | 141/38 |

*Primary Examiner*—Ernest G. Cusick

[57] ABSTRACT

An apparatus provides individual vehicle motorists with a simple, low-cost way to adjust and balance the pressure within their individual vehicle's tires without accidentally exceeding the maximum pressure level of the tires. The apparatus, interconnects the four tires with itself, and a pressure gauge and a conventional tire air-valve permits the internal air pressure of all four tires to be adjusted uniformly from one air source through a unique low cost combination of a commercial connector and a specially designed shut-off valve and to be disconnected without a loss of air in any of the four tires. If a pre-set air pressure level has been exceeded while air is being pumped into the tires, a safety air pressure-relief valve, coupled to a whistle, is triggered, notifying the motorist of this condition.

2 Claims, 2 Drawing Sheets

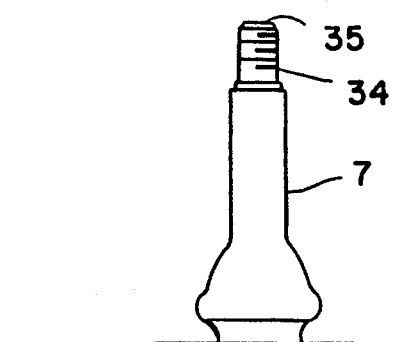
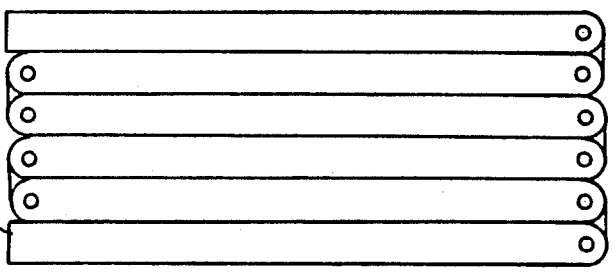
FIG. 1
FIG. 5

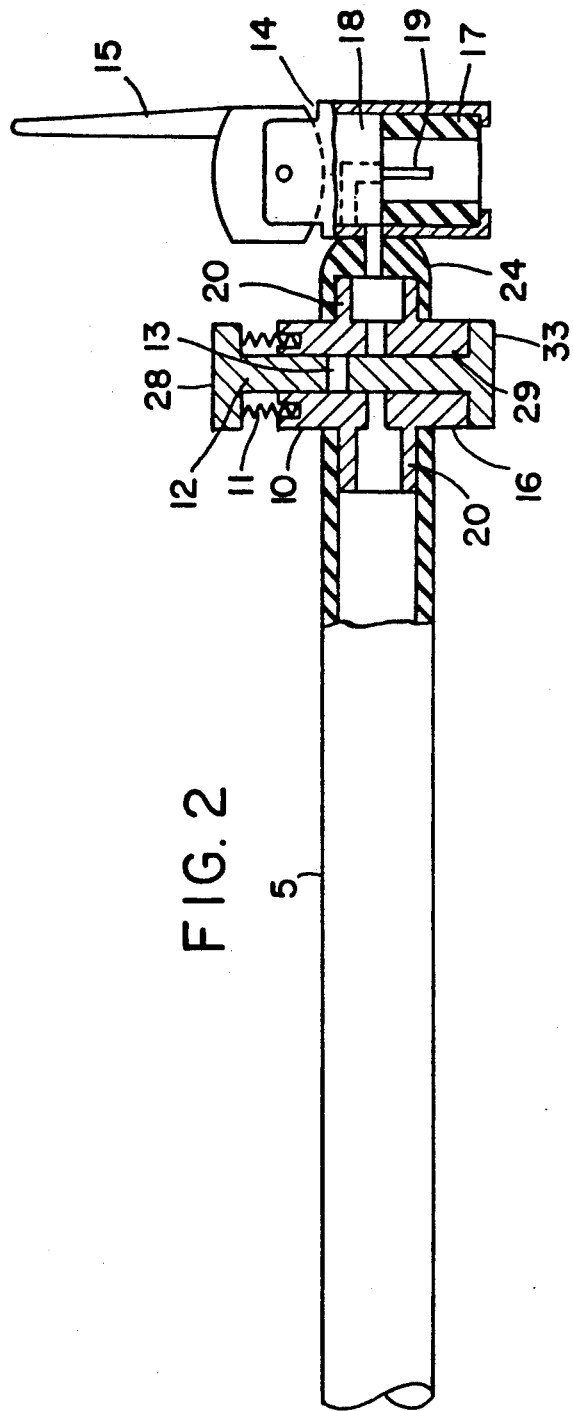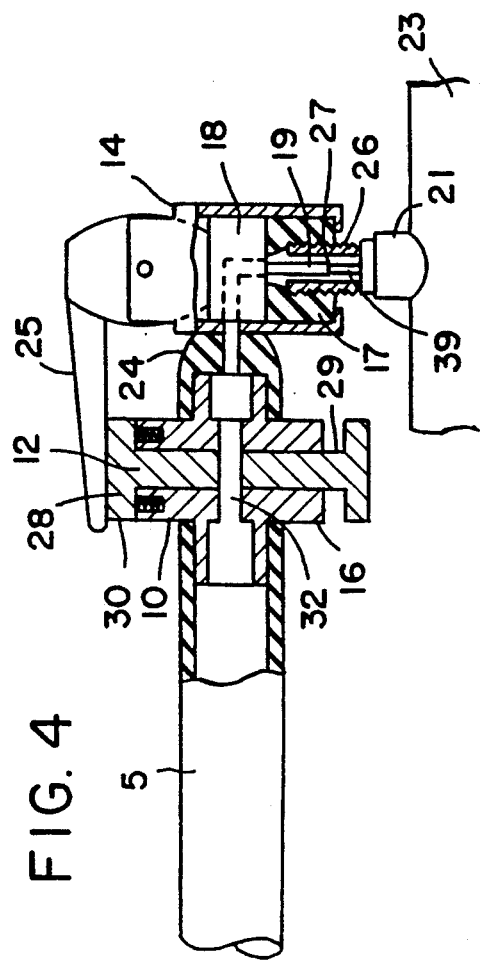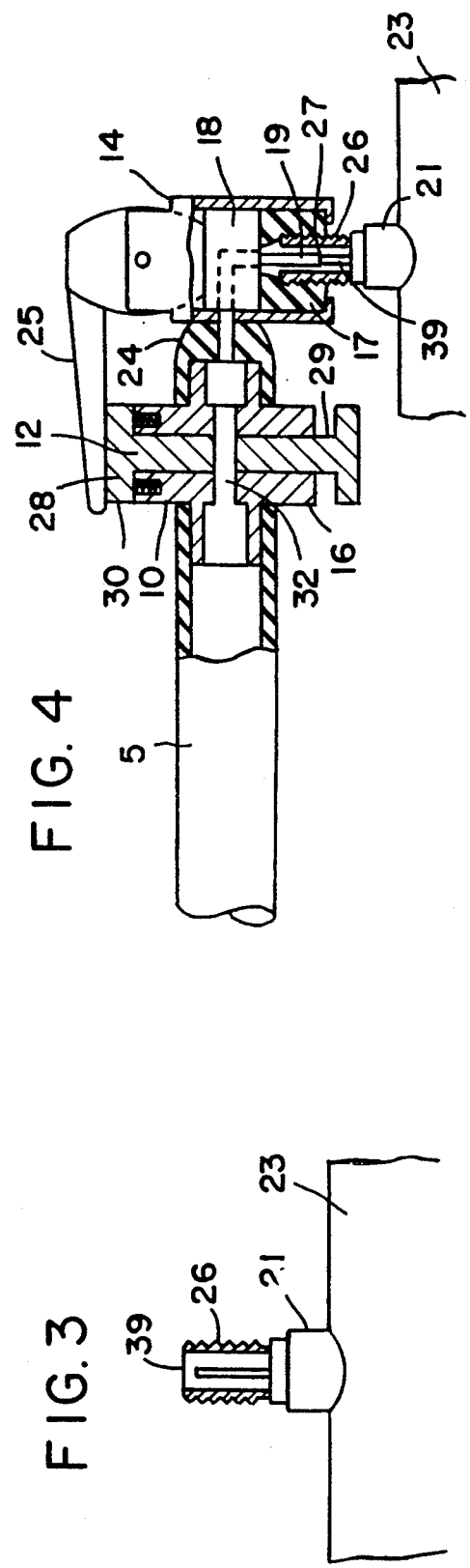

TIRE PRESSURE EQUALIZER

BACKGROUND OF THE INVENTION

1. Field of the Invention

The invention pertains to an apparatus and a method for using it which makes it easy and affordable for the motorist to balance and adjust the air pressure of all four tires on individual vehicles rapidly and simultaneously, thereby providing a greater degree of safety resulting from the more even traction of all of the tires, while also providing a safety to prevent accidental over-inflation which could damage the tires and the apparatus.

2. Description of the Prior Art

The importance of properly inflating tires has been recognized in the prior art, but most of the effort has been directed toward the tires of commercial and industrial vehicles which are inevitably inflated to a much higher pressure than individual vehicles. Thus, attempts have been made to assure that the tires of large commercial and industrial vehicles retain a near-constant air pressure through an elaborate system of sensors, compressors, valves and hoses which increase the pressure in the tires or reduce it if the pressure is excessive. Some of these systems are "on board" and quite complex. Yet little has been done to present a simple, inexpensive and nearly fool-proof way for the owner and/or driver of an individual vehicle to equalize the tire pressure in all four tires on the vehicle. Even when a service station is at hand, the standard air pressure supply system available there makes it extremely difficult for the driver to equalize the pressure in all four tires on an individual vehicle either by increasing or decreasing it in each tire separately. The difficulty in balancing the pressure in the tires on an individual vehicle stems from a number of factors. Thus, in a service station, the gauge that is attached to the hose on the air pressure supply pump is frequently inadequately calibrated to read with accuracy the air pressure that is delivered. Repeated use may have damaged or contaminated the gauge so that it no longer reads the pressure that is delivered, even if it was originally calibrated to do so. Not uncommonly, the gauge will have such a large pressure-reading capacity that small variations in pressure will be difficult to read on the scale. Such gauges may have errors in pressure readings alone of as much as three percent of full scale. Since service stations also service large trucks and their high-pressure tires, the pressure gauges connected to their air pressure supply pumps will have a scale of two hundred psi, ie., two hundred pounds per square inch capacity or even more. If a three percent error exists, it could readily produce an error of as much as six psi in the reading, a very significant twenty-percent error for air pressure in the tires of individual vehicles which normally have tire pressures under thirty psi. Even if a more accurate manual tire gauge is used to determine the pressure in the tires, it is still extremely difficult to inflate all tires accurately to the same desired pressure. Frequently, poor lighting will contribute to that error. As a result, even if care is taken in an effort to inflate all the tires to the same pressure, there may still be differences of several pounds per square inch of pressure among the four tires on the individual vehicle.

It is also well known that an imbalance in air pressure among a set of tires on an individual vehicle can make driving hazardous, especially in periods of inclement weather when the roads are wet or icy. There is nothing currently available to the motorist, either at the service station or in the individual vehicle, that would permit him to inflate all of the tires of his individual vehicle accurately and safely to the same pressure. Yet his safety depends to a large degree on the condition of his tires and tire traction is a significant part of individual vehicle safety. Tire traction is directly related to the tire surface that is in contact with the road as well as to the condition of the road and its surface. A tire with higher air pressure will have less surface in contact with the road and, conversely, a tire with lower air pressure will have more surface in contact with the road. As a result, when the front tires have not been inflated evenly to the same pressure, there can be significant differences in traction between them, with a tendency for the individual vehicle to veer to one side. If the individual vehicle is traveling on a wet or icy road, an imbalance of pressure in the front tires is greatly magnified and can easily cause accidents. Similarly, dangerous conditions exist when the individual vehicle is being accelerated with either the front or the rear tires, or when the brakes are applied to the front or the rear tires when there is an imbalance of pressure in them. Again, this situation is made considerably more dangerous on a wet or icy road.

Consequently, there has existed a need for a better and faster way of balancing the pressures in tires of individual vehicles so that they are as evenly matched as possible. McAnally et al, U.S. Pat. No. 4,872,492 control the amount of pressure provided to individual pneumatic tires, but present difficulty in providing precise equalization of pressure in multi-tire application. Keys, U.S. Pat. No. 4,883,107, provides a dual valve stem which either contains an adapter or to which an adapter is attached; the tire is inflated to a higher pressure than needed and then, upon removal of the air chuck, the pressure in the tires automatically adjusts to a lower pressure through a system of counterbalanced springs. However, while at first sight this appears to be a good idea, there are problems with this patent. Thus, there are the definite dangers of contamination of the pressure-reduction valve, with a loss of air and the inaccuracies that would result therefrom. Besides, the adjustment device would have to be inherently accurate. Springs are notorious for binding and setting. There is nothing within the patent to indicate that an attempt was made to accurately measure the air pressures obtained in actual repeated tire pressure adjustments, i.e., to show that it does what it is supposed to do. For this specific design, it would appear that there could be a wide variation in tire pressures during the use of this device from one tire air-valve to another. Another objection would be the need to keep the device attached to the tire air-valve in light of the increase in torque that would be exerted on the tire air-valve by the additional length and weight of the dual valve stem with the adapter, coupled with the high probability of damage resulting from contamination, transportation/vibration and the possible contact the tire would make with the curb. Da Silva, U.S. Pat. No. 4,875,509 shows a device for simultaneously filling and equalizing the pressure in dual tires, but it is not portable. Moffett, U.S. Pat. No. 5,158,122 designs a portable device for use with dual pneumatic tires in which he patents a high-pressure locking tire chuck valve to secure air supplying hoses to dual pneumatic tire valves. This locking tire chuck valve was needed in his design because of the fact that the pressures in dual pneumatic truck tires may be as high as two hundred psi, i.e., pounds per square inch. But it is not needed here where individual vehicles have much lower tire pressures, i.e., in the twenty-four to twenty-eight psi region. There are other reasons for not using this valve here. Thus, this locking tire chuck valve is complex, not commercially available, and it would be far too costly to produce for use with equipment that would require four such valves for each item produced, as is the case here, making its use here economically undesirable. Moffett also provides an air-bleed valve to reduce manually the pressure in the dual pneumatic tires. This would be superfluous if a tire air-valve fulfills this function as it does here. Also, none of the approaches provide a safety device to prevent accidental over-inflation of the tires.

This invention attempts to overcome the problems and limitations of prior inventions so as to inflate all four tires on individual vehicles simply, safely, economically and simultaneously to the same pressure. It does not do so by relying upon the mechanical qualities of spring-loaded valves since these are unreliable and inaccurate, nor does it resort to the use of expensive components that would make the price excessive for the average motorist.

Instead, the invention relies upon the implementation of a scientifically known principle in a novel way that assures the equalization of the pressures in all four tires on an individual vehicle, and keeps the price down through the use of a low-cost, commercially available connector for attaching to the tire air-valves on all four tires of an individual vehicle. Air may then be added either by a foot-pressure air-pump or by an electrically-powered air-pump, the latter usually being powered from the cigarette lighter outlet of the individual vehicle. But, as was discovered during the use of these low-cost connectors, they do not possess an automated on/off capability when they are attached or detached to tire air-valves.

Thus, when these were tested for use with this invention, it was found that there was considerable air loss during the time when all the connectors were being detached from the four tire air-valves of the individual vehicle, with the greatest air loss occurring when the last tire was being disconnected. This could not be tolerated. A conventional hand-operated shut-off switch was added initially, but was eliminated when it was found that this would complicate the operation of the apparatus by requiring the motorist to turn it on and off repeatedly, thereby making the apparatus much less desirable. Consequently, it was determined that a simple, low-cost, automatic on/off capability (valve) was needed, one that would turn on and off as each connector was attached to a tire air-valve and then detached. Such a valve was designed specifically for this apparatus, with the objectives being low price, reliability and compatibility. It is attached by a clamp to the connector so that it is oriented in such a way that, at the moment of attachment to the tire air-valve, the connector will turn on the tire air-valve and then turn it off at the moment of detachment from the tire air-valve. The connector selected for use in this invention is used in high volume in many air-pumps, making it low in cost and commercially available. It is composed of a cylindrical body and a handle which, in the open position, protrudes in line with the cylindrical body, and wherein a piston located within the cylindrical body is locked in a downward position by pivoting the connector handle down into a ninety-degree position. The piston rests upon a rubber tube, confined top, bottom and outer diameter, within that cylindrical body, taking up about half of the lower open end of the cylindrical body used for attaching the tire air-valve. The rubber tube presses against the piston and prevents it from sliding down within the cylindrical body. When the connector is placed over the tire air-valve, the rubber tube within the connector fits loosely over the threaded portion of the tire air-valve. In order to fit the connector tightly to the tire air-valve, the handle on top of the connector is pivoted down into a ninety-degree position. This action depresses and advances both the piston and a centrally located, small-diameter rod attached to its end. As the piston advances, it compresses the rubber tube which, being confined top, bottom and outer diameter within the connector, can move in only one direction ... curving inward ... thereby taking up the space around the threaded portion of the tire air-valve and forming an air-tight connection with it, strong enough to resist internal air pressures of 50 psi. Simultaneously, the forward movement of the small-diameter rod centrally located on the piston causes it to impinge on the stem of the tire air-valve, depressing it and forcing the tire air-valve to open. The pivoting of the handle of the connector to the ninety-degree position, parallel with the cylindrical body, depresses the spring-loaded piston of the shut-off valve into the open position.

When all of the connections with the four tire air-valves have been made, air circulates to all the tires through a central air reservoir (composed for the sake of compactness of a hollow rectangular container with a tire air-valve located on one end), and the pressure then equalizes within the tires and the apparatus. The pressure within the tires can now be read on an air pressure gauge with a scale of fifty to one hundred psi, calibrated to be within one percent of full scale readings, and located on the side of the container opposite to the four outlets. Air pressure can be increased by supplying air from an air pump to the tire air-valve located at one end of the hollow rectangular container, or excess air can be released from it by depressing the valve stem until the desired pressure is read on the air pressure gauge. When the proper pressure reading has been obtained, the connectors are detached, one after another, from the threaded portion of each tire air-valve. This closes both the tire air-valves and the shut-off valves, while retaining the pressure within the tires. The tire air-valve caps are then replaced.

Since the possibility exists that, during the pumping of air into the apparatus, the air-pump may be left unattended and excessive pressure will be pumped into the tires, possibly resulting in damage to the tires and the apparatus, a safety air pressure-relief valve set to open at about thirty-five psi was incorporated within the apparatus and topped off with a whistle that allows the excess air to escape through it, making an audible whistling sound and thereby notifying the motorist that the safety air pressure-relief valve has gone off and that the air-pump should be disconnected.

SUMMARY OF THE INVENTION

The limitations and disadvantages of prior art systems and devices for motorists themselves to equalize and adjust the pressure in all four tires on their individual vehicles to equal levels, so as to provide an increased degree of safety, are overcome by this invention which also provides a safety to prevent over-inflation and damage to the tires and to the apparatus used to inflate them. The invention provides a relatively inexpensive apparatus, using an established, reliable, scientific principle, to bring the pressure in the tires near their required pressure, to equalize the pressures in the tires, and to provide a method for using the apparatus. The low price results, to a large degree, from a novel combination of a low-cost, commercially available connector and a low-cost shut-off valve especially designed for this application. Four such connectors and shut-off valves interconnect the air in all four tires of an individual vehicle through a central air reservoir, permitting the tires to be inflated simultaneously and rapidly to identical pressure from one pressure source, while preventing them from being over-inflated to dangerous levels through the incorporation of a safety air pressure-relief valve made audible by a whistle mated to it. If the air-pump is accidentally left unattended, and the pressure exceeds the trigger value of the safety air pressure-relief valve, (about thirty five psi here), then the safety air pressure-relief valve is activated and noise is made by a whistle mated with the valve, informing the motorist that the safety air pressure-relief valve has been set off and that the pump should be disconnected.

The apparatus is partially composed of a central air reservoir which, for reasons of compactness, consists of a hollow rectangular container with four tubular outlets located on one side, each of the four tubular outlets coming to a serrated end, and a pressure gauge, calibrated to be within one percent of its scale reading of between fifty and one hundred psi, located on the side directly opposite to the four outlets; and where four hoses, all capable of withstanding pressures of fifty psi, are joined to the serrated ends of the four tubular outlets and where these joints are also capable of withstanding fifty psi of internal air pressure and where each of the four hoses terminates in a shut-off valve mated to a connector, to be attached to a tire air-valve on one of the individual vehicle's tires; and where a conventional tire air-valve is located at one end of the hollow rectangular container; and at the other end of the hollow rectangular container is located a safety air pressure-relief valve, opening at about thirty-five psi and mated to a whistle so that air escaping through the safety air pressure-relief valve would set off the whistle.

The hoses are two feet, ten feet, ten feet and eighteen feet long respectively, since it was found that these hose-lengths would be able to reach all of the tire air-valves on an individual vehicle when the hollow rectangular container is placed next to one of the tires and the two-foot hose is connected to it. Next, the end of one ten-foot long hose is positioned at the second tire on the same side of the individual vehicle while the two remaining hoses, one ten feet and one eighteen feet in length, are pushed with an extended folding stick underneath the individual vehicle so that their ends are positioned near the two tires on the opposite side of the individual vehicle. Obviously, the hoses could be cut longer if they are to be used for limousines and the like. The connectors at the ends of the four hoses are attached to each of the tire air-valves as follows: Each connector contains inside a rubber tube which fits loosely over the threaded portion of the tire air-valve and which, when the connector handle is pivoted and secured in a ninety-degree position, forms a connection between the compressed rubber tube and the threaded portion of the tire air-valve that is capable of remaining air-tight at pressures of fifty psi. The tire air-valve opens when the connector handle is pivoted and retained in the ninety-degree position. The shut-off valve, especially designed for this application, is located just before the connector and clamped to that connector in such an orientation that the process of locking the connector to the tire air-valve also opens the shut-off valve, permitting air to flow from the tire through the hose into the hollow rectangular container and, when all of the connections have been made, to circulate back and forth through all four tires, assuring accurate equalization of the air pressure.

When all four connections have been made, the pressure in all four tires stabilizes to a common value. The pressure in the tires is then read on the gauge located on the hollow rectangular container. Air may be supplied to the hollow rectangular container through the tire air-valve located at one end of that hollow rectangular container, or air may be removed by depressing the tire air-valve's stem until the desired pressure reading is obtained from the gauge. When the desired pressure is obtained, the connectors on the four tire air-valves of the four individual vehicle's tires are detached one by one, causing each shut-off valve and each tire air-valve to close immediately as each of the connectors is detached. The four tire air-valve caps are then replaced.

Obviously, minor changes could be made in the invention without changing its function, so we do not wish to be limited in exact details but only to the spirit, purpose, general design and method of use as outlined in these claims and specifications.

BRIEF DESCRIPTION OF THE DRAWINGS

Other advantages of the invention will become apparent from the following detailed description of the invention in conjunction with the accompanying drawings which illustrate the components and connections of the tire pressure equalizer apparatus and its method of use before and after it is attached to the four individual vehicle's tire air-valves.

In FIG. 1, we show a view of the central air reservoir 1 of the apparatus, to which are connected the four hoses 5, a conventional tire valve 7, a safety air pressure-relief valve 8, mated to a whistle 9, and a pressure gauge 4.

In FIG. 2, we show one cut-away portion of the four hoses 5 leading up to the shut-off valve 10 mated to the connector 14 before the connector 14 is attached to the threaded portion 26 of the tire air-valve 21.

In FIG. 3, we show one cut-away of a tire air-valve 21 with its valve stem 39.

In FIG. 4, we show one cut-away portion of the four hoses 5, including the shut-off valve 10 and the connector 14, after the connector 14 has been attached to the threaded portion 26 of the tire air-valve 21.

In FIG. 5, we show a folding extension stick 40 in the folded state.

DETAILED DESCRIPTION OF THE INVENTION

Description will hereunder be given of an embodiment of the present invention with reference to the drawings.

In FIG. 1, we show a view of the central air reservoir, which in the case of the preferred embodiment consists of a hollow rectangular container 1 to which are attached four tubular outlets 2, whose ends have serrated edges 3 so as to permit a hose 5, to be tightly connected to each of these serrated ends 3 of the tubular outlets 2, and therefore to resist being pulled apart when internal air pressures of as high as fifty psi are exerted on the joint. An air pressure gauge 4, calibrated to be within one percent of its scale reading of fifty to one hundred psi, is located on the side 6 directly opposite to the side on which the hoses are located. A conventional tire air-valve 7 is attached to one end of the hollow rectangular container 1. A safety air pressure-relief valve 8, spring loaded to open at about 35 psi, is connected to the other end. The end of that safety air pressure-relief valve 8 is mated to a whistle 9, so that escaping air resulting from the tripping of the safety air pressure-relief valve 8 would cause the whistle 9 to make noise. The hoses 5, connected to the serrated ends 3 of the four outlets 2 are two feet, ten feet, ten feet and eighteen feet in length, to enable them to reach all four tires on an individual vehicle when the hollow rectangular container 1 is positioned next to any one of the four tires.

In FIG. 2, we show one of the four hoses 5 and the manner in which both the shut-off valve 10 and the connector 14 are attached to these hoses 5. Near (but not at) the end of each of the hoses is located a shut-off valve 10 which is composed of a cylinder 16 and a spring 11 loaded piston 12 within that cylinder 16 wherein that piston 12 is keyed 29 to the cylinder 16 so that a cylindrically-shaped hole 13 through the piston 12 is parallel with two tubes 20 attached halfway on the cylinder 16. The tubes 20 are open to the cylinder, with one tube used to attach the shut-off valve 10 to the hose 5 and to attach the other tube to the clamp 24, linking it to the connector 14 next to it and keeping it in a preferred orientation. With the spring 11 extended, the position of the piston is such that the cylindrically-shaped hole 13 within it is surrounded by the wall of the cylinder 16 and therefore the shut-off valve 10 is in the off position. Immediately next to the shut-off valve 10, and at the end of the hose, is the connector 14 which has a handle 15 jutting up from its cylindrical body. Within that cylindrical body and directly below that handle 15 is located a piston 18. The piston 18 has a short, small-diameter rod 19 centrally located at its end about halfway down inside the connector 14. The piston 18 rests on a rubber tube 17 which is confined, top, bottom and outer diameter, within the open end of the cylindrical body of the connector 14. The inner diameter of the rubber tube 17 is such that it fits loosely around the threaded portion 26 of the tire air-valve 21.

In FIG. 3, we show a tire air-valve 21, the threaded portion 26 and the valve stem 39 of said tire air-valve 21, all connected to the tire 23.

In FIG. 4, we show the same components mentioned under FIG. 2, except for the fact that FIG. 4 shows the appearance of the shut-off valve 10 and of the connector 14 after it has been attached to the tire air-valve 21. The attachment is made by placing the connector 14 over the threaded portion 26 of the tire air-valve 21. The handle 15 of the connector 14 is then pivoted and secured in the ninety-degree position 25. This action forces the piston 18 within the connector 14 to move down, compressing the rubber tube 17 which can only expand by curving inward and then tightening around the threaded portion 26 of the tire air-valve 21, connected to the tire 23, while the movement of the piston 18 causes the centrally located, short, small-diameter rod 19 at the end of the piston 18 to be advanced to a position 27 and to make contact with the valve stem 39 of the tire air-valve 21, depressing it and thereby opening the tire air-valve 21. The relative position and attitude of the specially designed shut-off valve 10 and the connector 14 are such that the motion of pivoting the handle of the connector and securing it in the ninety-degree position 25, also presses the handle against the upper enlarged portion 28 of the spring-loaded piston 12 of the shut-off valve 10 and causes the piston 12 to be depressed 30 and thereby moves the cylindrically shaped hole 13 within the piston so that it becomes aligned 32 with the openings of the tubes 20 and consequently open to the hose 5. When all four of the connectors 14 have been attached to the four tire air-valves 21, air can flow freely among the four tires, thereby equalizing the pressure in the tires.

The method of using this invention uses the embodiments of FIGS. 1, 2, 3, 4 and 5. It involves placing the hollow rectangular container 1 next to one of the tires of the individual vehicle, removing the tire air-valve cap and attaching the connector 14 on the two-foot long hose to the tire air-valve 21 by placing the open end of the connector 14 over the threaded portion 26 of the tire air-valve 21 and pivoting the connector handle 15 into the ninety-degree position 25 and retaining it therein. This is followed by pulling a ten-foot-long hose 5 over to the second tire on the same side of the individual vehicle and repeating the attachment. The folded extending stick 40 is then extended and used to push the two remaining hoses 5 underneath the individual vehicle until the two hoses 5 are each near one of the two tires on the far side of the individual vehicle, then the process of attaching these to the threaded portion 26 of the tire air-valves 21 is repeated as noted before. A pressure reading is then taken on the pressure gauge 4 located opposite 6 to the hoses 5 on the hollow rectangular container 1. If pressure needs to be increased, it can be done either by a foot-powered air-pump or by an electrically-powered air-pump connected to the threaded portion 34 of the tire air-valve 7 located at one end of said hollow rectangular container 1 until the desired tire pressure has been obtained. If the electrically-powered air-pump, attached to the tire air-valve 7, is accidentally left running and the pressure reaches a level that will trip the safety air pressure-relief valve 8, then this is activated, causing air to escape through the above tire air-valve 7 and to blow through the whistle 9, making noise and thereby informing the motorist that the air-pump needs to be shut off. When the pressure has finally been adjusted to the right level, as shown by a satisfactory pressure reading at the air-pressure gauge 4 located on the hollow rectangular container 1, then the four connectors 14 are detached, one after another, from the four tire air-valves 21 by pivoting the handle 15 of the connector 14 upwards to a position in line with the body of the connector 14. The connectors 14 are then detached from the tire air-valves 21 and the tire air-valve caps are screwed back on to the tire air-valves 21. All of the tires should now be at the same pressure.

I claim:

2. A method for using the apparatus of claim 1 so as to bring all of the four tires of individual vehicles accurately to the identical pressure level, that level being as near as possible to the pressure level recommended by the manufacturer of the tires, the method comprising;

(a) placing the central air reservoir, consisting of said hollow rectangular container next to one of the tires, removing the cap of the tire air-valve and placing the open end of the connector located on the hose, two feet in length, over the threaded portion of said tire air-valve and pivoting the handle of the connector so said handle is retained in a ninety-degree position;

(b) extending a hose, ten feet in length, to a second tire on the same side of the individual vehicle and repeating the process of attaching the connector as in (a);

(c) extending the other two hoses, one ten feet and one eighteen feet in length, underneath the individual vehicle by means of said folding stick so that the end of each of said other hoses is located next to a tire, then attaching the connectors to the two tire air-valves as in (a);

(d) reading the air pressure gauge located on said longitudinal side of the hollow rectangular container;

(e) wherein, if the pressure reading is in excess of that recommended by the manufacturer of the individual vehicle's tires, depressing the stem of the tire air-valve located on said one end of the hollow rectangular container until the pressure has been lowered to the desired level;

(f) if the pressure is too low, attaching the connector of an air-pump to the threaded portion of the tire air-valve located on said one end of the hollow rectangular container and supplying compressed air;

(g) stopping the supplying of air in order to read the measurement of the air pressure gauge located on the hollow rectangular container;

(h) adding or removing air as stated before until the desired pressure level is obtained;

(i) disconnecting the pump is the safety air pressure-relief valve has been activated as evidenced by the noise made by the whistle;

(j) disconnecting the connectors and replacing the tire air-valve caps.

1. An apparatus for direct and simple use by a motorist, enabling all four tires of an individual vehicle to be brought to the same desired pressure, without damaging the tires or the apparatus by accidental over-inflation, the apparatus comprising:

a central air reservoir consisting of a hollow rectangular container on which are located seven outlets;

four tubular outlets, which are located on one longitudinal side of that hollow rectangular container, wherein all four tubular outlets have serrated ends to permit them to be tightly attached to four hoses;

an air pressure gauge, measuring between fifty and one hundred psi, calibrated to within one percent of capacity and located on the longitudinal side directly opposite the side where the four outlets are located;

a conventional tire air-valve located on one end of that hollow rectangular container;

a safety air pressure-relief valve located on the other end of the container, wherein the safety air pressure-relief valve is set to activate at thirty-five psi and a whistle is connected to said safety air pressure-relief valve that escaping air will pass through the whistle and make noise if the safety air pressure-relief valve has been tripped;

four hoses, one two feet, one ten feet, another ten feet and one eighteen feet in length, attached to the four tubular outlets in any order;

a folding stick which, when extended, is used to project two of the hoses underneath the individual vehicle to its far side in order to minimize the length of the hoses needed;

four connectors, each consisting of a cylindrical body, a handle, pivotally connected to the body, a sliding piston below the handle within the cylindrical body of each connector with a centrally located, short, small-diameter rod at its forward end, rubber tubing confined within the body of the connector and located below the piston and so confined that it is unable to move up, down or outward, and where the tubing supports the piston, the inner diameter of the tubing being such that it fits loosely around the threaded portion of a tire air-valve when the connector is placed over it;

the sliding piston within the cylindrical body of the connector, pressed down when the handle of the connector is pivoted, thereby locking in the ninety degree-degree position, forcing the rubber tube to expand curving inward, so as to be pressed around the threaded portion of the tire air-valve and forming an air-tight fit with it, while the movement of that piston also moves the short, small-diameter rod located on its end forward, causing that short, small-diameter rod to depress the stem of the tire air-valve and thereby opening the tire air-valve;

a shut-off valve, located next to the connector, composed of a cylinder with two tubes centrally attached on either side of the cylinder and open to the interior of the cylinder and used to attach the cylinder to the hose on one side and to clamp the connector to the shut-off valve on the other tube, including a rigid clamp to keep the connector in a preferred orientation;

a spring-loaded piston moving between an upper and lower position within said cylinder, wherein the piston includes an enlarged portion at its upper and lower end, said piston is keyed in position within the cylinder so as to stay in one orientation and where the piston has a cylindrically-shaped hole through it, said hole having an orientation parallel with the two tubes and where, in the upper position, the cylindrically-shaped hole is located near the top of the cylinder and confined by the interior wall of the cylinder;

a spring disposed which keeps the piston within the cylinder in the upper position, causing the cylindrically-shaped hole within the piston to be contained within the confines of the walls of the cylinder and therefore the valve to be in a closed position as long as the spring is extended;

the connector and the spring-loaded piston of the shut-off valve, so situated in relationship to one another that the handle of the connector, when pivoted and retained in a ninety-degree position, also depresses the spring-loaded piston of the shut-off valve causing the piston to move inside the cylinder to said lower position;

the cylindrically-shaped hole within the piston, moved as a result of the movement of the piston, aligned with the openings of the tubes, causing a passage to be defined through the shut-off valve;

said four connectors, attached to threaded portion of tire air-valves on all four tires on the individual vehicles in the manner described;

the air-pressure gauge located on one side of the hollow rectangular container, used for taking pressure readings to determine whether the desired air pressure for the tires has been obtained;

the tire air-valve located on one end of the hollow rectangular container, whose valve stem is depressed in order to remove air if the pressure is excessive or to which the air-pump is attached in order to increase the pressure level within the tires.

\* \* \* \* \*